C. T. HENDERSON & H. J. HARRIES.
MOTOR CONTROLLER.
APPLICATION FILED NOV. 2, 1914.
1,238,516.
Patented Aug. 28, 1917.
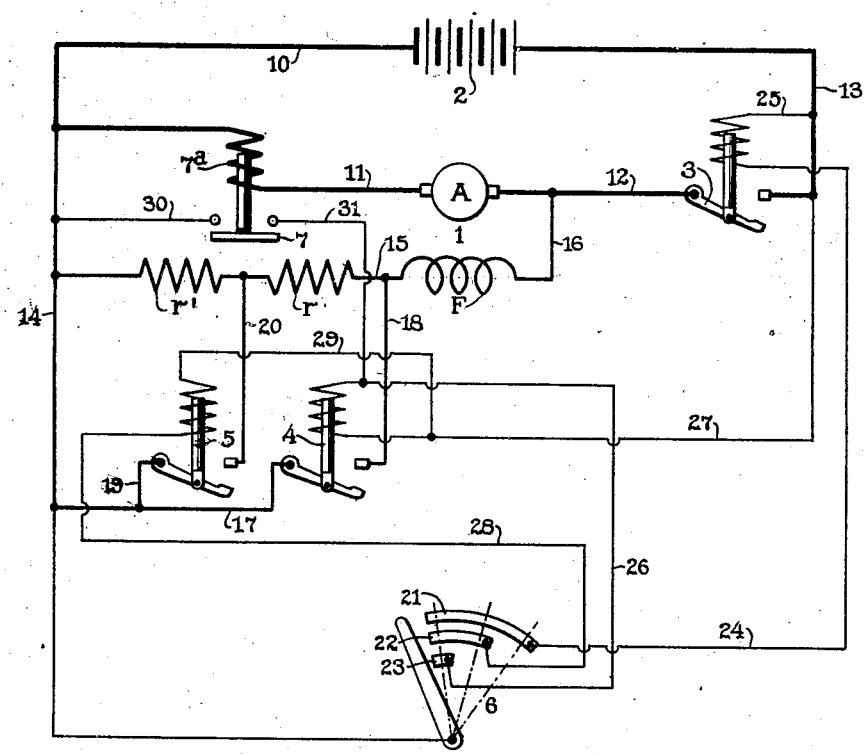
Witnesses
J. L. Johnson
Inventors
Clark T. Henderson
Herbert J. Harries
By Frank H. Hubbard
Attorney

UNITED STATES PATENT OFFICE.

CLARK T. HENDERSON AND HERBERT J. HARRIES, OF MILWAUKEE, WISCONSIN, ASSIGNORS TO THE CUTLER-HAMMER MFG. CO., OF MILWAUKEE, WISCONSIN, A CORPORATION OF WISCONSIN.

MOTOR-CONTROLLER.

1,238,516.  Specification of Letters Patent.  Patented Aug. 28, 1917.

Application filed November 2, 1914. Serial No. 369,923.

*To all whom it may concern:*

Be it known that we, CLARK T. HENDERSON and HERBERT J. HARRIES, citizens of the United States, residing at Milwaukee, in the county of Milwaukee and State of Wisconsin, have invented new and useful Improvements in Motor-Controllers, of which the following is a full, clear, concise, and exact description, reference being had to the accompanying drawings, forming a part of this specification.

This invention relates to controllers for electric motors and more particularly to controllers for shunt motors.

One of the objects of the invention is to provide an improved controller whereby the field strength of the controlled motor may be varied at will for speed regulation and automatically governed to insure a strong field under predetermined current conditions in the armature circuit.

A more specific object of the invention is to provide a controller wherein the motor field may be controlled at will and automatically through a common medium, such, for example, as a magnetic switch.

Various other objects and advantages of the invention will hereinafter appear.

As will be apparent, controllers embodying the invention may be advantageously employed in various different relations. For example, such a controller is highly advantageous for electric vehicles, the same providing for accelerated speed of the vehicle by field weakening of its driving motor and yet insuring a strong field in starting and further insuring field strengthening upon a predetermined increase in the load on the driving motor while running with a weakened field.

The accompanying drawing diagrammatically illustrates one embodiment of the invention particularly adapted for motor vehicles and the same will now be described, it being understood that the invention is not limited to the specific embodiment thereof chosen for illustration.

The drawing shows a motor 1 having an armature A and a shunt field winding F supplied with current from a storage battery 2 as is customary in electric vehicles. Further, the field circuit of the motor is shown as provided with two steps of resistance $r$ and $r'$ for reducing the field strength of the motor for an increased speed. It should, of course, be understood that the number of steps of resistance may be reduced to one or increased, as desired.

The controller includes a magnetic switch 3 controlling the continuity of the motor circuit, magnetic switches 4 and 5 controlling the field resistances $r$ and $r'$, a master switch 6 controlling the aforesaid magnetic switches, and an electro-responsive relay switch 7 controlling the field resistance switch 5. The relay switch 7 is preferably of the vibrating type and has its winding $7^a$ connected in series with the motor armature.

Briefly described, the controller functions as follows:

In the first operative position of the master switch the switch 3 is energized to complete the motor circuit while the switches 4 and 5 are also energized to short-circuit the two steps of field resistance, thereby giving maximum field strength. In the next operative position of the master switch the switch 4 is deënergized to open the short-circuit around the resistance $r$ thereby including said resistance in circuit and weakening the motor field for a higher speed. Then when the master switch is moved to its third operative position the switch 5 is deënergized to open the short circuit around the resistance $r'$, thereby including said resistance to further weaken the motor field for a still higher speed. The relay 7, as above stated, is responsive to the armature current, and upon responding energizes switch 4 which is so connected in circuit as to short-circuit both resistances $r$ and $r'$, thereby increasing the field strength to maximum. In consequence, it will be apparent, that however the master switch is operated in starting, the relay switch 7 and the resistance switch 4 will insure full field strength upon increase of the armature current to the value for which said relay is set to respond and that however said master switch may be set for running, full field strength will also be insured by the relay switch 7 and switch 4 should the armature current subsequently rise to a value sufficient to effect response of said relay. This provides for protection of the motor both in starting and running even under careless handling of the master switch, and further-more effects said protection by the mere addition of a small relay acting upon one of the switches provided for manual regulation.

The circuit arrangement and functions of the controller will now be more specifically described: The armature circuit of the motor may be traced from the lefthand terminal of the battery 2 by conductor 10 through the winding $7^a$ of relay switch 7, by conductor 11 through the motor armature A, by conductor 12 through the switch 3, when closed, by conductor 13 to the opposite side of the battery. The field circuit may be traced from the left hand side of the battery by conductors 10 and 14 through the resistances $r'$ and $r$ when not short-circuited, by conductor 15 through the field winding F, by conductor 16 and thence through the switch 3 when closed to the opposite side of the battery as already traced. With both switches 4 and 5 closed then circuit extends around the resistances from conductor 14 by conductor 17 through the switch 4, by conductor 18 directly to the motor field winding. When, however, switch 4 is opened circuit extends from conductor 14 by conductors 17 and 19 through switch 5, by conductor 20 to the left hand terminal of the resistance $r$, thereby including said resistance $r$ in the field circuit and when switch 5 is opened the field current is forced to pass through both resistances $r'$ and $r$, as already traced. The foregoing constitutes all of the power circuits involved.

The master switch, which has been illustrated in a very simplified form, includes a pivoted arm movable over three contact segments 21, 22 and 23 to control the windings of switches 3, 5 and 4 respectively. In its first position the arm engages all three of said segments to energize all three of the switches mentioned. The energizing circuit of switch 3 extends from the left hand side of the battery by conductors 10 and 14 through the master switch to segment 21, by conductor 24 through the winding of said switch 3, by conductors 25 and 13 to the right hand side of the battery. The energizing circuit of switch 4 extends from the left hand side of the battery to the master switch, as already traced, and from segment 23 thereof by conductor 26 through the winding of said switch 4, by conductors 27 and 13 to the right hand side of the battery. The energizing circuit of switch 5 extends from segment 22 of the master switch by conductor 28 through the winding of said switch 5, by conductors 29, 27 and 13 to the right hand side of the battery. Thus the master switch in its first position starts the motor with full field strength.

When the master switch is moved to its second position it disengages segment 23, thereby deënergizing switch 4 with a consequent inclusion of the resistance $r$, and when moved to its third operative position disengages the segment 22, thereby deënergizing relay 5 with a consequent inclusion of the resistance $r'$, as above described.

The circuit controlled by the relay switch 7 extends from the left hand side of the battery by conductors 10, 14 and 30 through said relay switch, by conductor 31 through the operating winding of switch 4 to conductor 27 and thence to the right hand side of the battery. It will thus be observed that the relay switch 7 controls an energizing circuit for the switch 4 in parallel to the energizing circuit for said switch controlled by the master switch. In consequence, it will be apparent that as above stated, switch 4 will be responsive to the relay 7 even with the master switch set in a position to deënergize the same. Likewise it will be apparent that with the relay 7 closed movement of the master switch to its second or third operative position will have no effect upon the resistance switches until normal current conditions are reëstablished in the armature circuit and the relay 7 released. In other words, the manual regulation of the field strength for acceleration is always subservient to the automatic regulating means.

What we claim as new and desire to secure by Letters Patent is:

1. In combination, a motor having a shunt field, power-operated field regulating means therefor and independently operable manual and automatic means for directing the operation of said power controlled means.

2. In combination, a motor having a shunt field, power actuated field regulating means therefor and manual and automatic means for directing the operation of said power actuated means, said manual means being subservient to said automatic means for field weakening.

3. In combination, a motor having a shunt field, power actuated field regulating means therefor and manual and automatic means for directing the operation of said power actuated means, said manual means being subservient to said automatic means for field weakening and said automatic means being independent of said manual means for field strengthening.

4. In combination, a motor having a shunt field, independently operable manual and automatic means for directing field regulation thereof and common means controlled thereby for effecting the directed regulation.

5. In combination, a motor having a shunt field, manual and automatic means for directing field regulation thereof and common means controlled thereby for effecting the directed regulation, said automatic means under certain current conditions in the armature circuit predominating said manual means in the control of said regulator.

6. In combination, a motor having a shunt field, means for varying the field strength of said motor and manual and automatic means directing the operation of said regulating means, said automatic means, under certain current conditions in the armature circuit predominating said manual means to insure a strong field.

7. In combination, a motor having a shunt field, power actuated field regulating means therefor, manual means directing the operation thereof to determine the field regulation and automatic means also directing the operation of said first mentioned means to insure a predetermined field strength under abnormal current conditions in the armature circuit irrespective of said manual means and to restore field strength to the value determined by said manual means upon restoration of normal current conditions in the armature circuit.

8. In combination, a motor having a shunt field, electro-responsive field regulating means therefor, manual means controlling said electro-responsive means to vary the field strength at will and electro-responsive means responsive to variations in the armature current to also control said first mentioned means.

9. In combination, a motor having a shunt field, electro-responsive field regulating means therefor, electroresponsive controlling means for said former means responsive to insure a predetermined field strength under certain current conditions in the armature circuit and manual control means for said regulating means to effect reduction of the field strength but subject to the aforesaid action of said former controlling means.

10. In combination, a motor having a shunt field, electro-responsive field regulating means therefor, electro-responsive means responsive to the armature current to effect energization of said first mentioned means and manual means to energize and deënergize said first mentioned electro-responsive means.

11. In combination, a motor having a shunt field electro-responsive field regulating means therefor, manual means for energizing and deënergizing said electro-responsive means to respectively strengthen and weaken the motor field and electro-responsive means responsive to the motor current to insure energization of said first mentioned means independently of said manual means while predetermined current conditions exist in the motor circuit.

12. In combination, a motor having a shunt field, a plurality of power operated switches and means controlled thereby for effecting different degrees of field regulation and one being operable to insure full field strength independently of the others and automatic means controlling the operation of said last mentioned switch.

13. In combination, a motor having a shunt field, a plurality of power operated switches and means controlled thereby for varying the motor field strength to different degrees and one of said switches being operable to effect maximum field strengthening, manual means for directing the operation of all of said switches and automatic means controlling the operation of said last mentioned switch.

14. In combination, a motor having a shunt field winding, field regulating means including a plurality of electro-responsive switches for varying the motor field strength to different degrees and one of said switches being operable to restore full field strength independently of the remainder thereof, manual means for directing operation of all of said switches and electro-responsive means responsive to the motor current to also control said last mentioned switch.

15. In a controller for electric motors, the combination with a motor and a supply circuit, of a variable resistance in the field circuit of said motor, a manually operable switch arm arranged to close the motor circuit and to coöperate with said variable field resistance to accelerate the motor, a short circuit around said resistance, and a fluttering switch having a coil in series with the armature of the motor and responsive to fluctuation of current therethrough to automatically close and open said short circuit.

In witness whereof, we have each hereunto subscribed our name in the presence of witnesses.

CLARK T. HENDERSON.
HERBERT J. HARRIES.

Witnesses:
TEHLA BAST,
L. A. WATSON,
ELIZABETH EBERLY,
TEHLA BAST.